United States Patent
Ruprecht

[19]

[11] Patent Number: 6,134,241
[45] Date of Patent: Oct. 17, 2000

[54] TELECOMMUNICATION SYSTEM

[75] Inventor: Michael Ruprecht, Coburg, Germany

[73] Assignee: U.S. Philips Corporation, New York, N.Y.

[21] Appl. No.: 08/737,185

[22] PCT Filed: Feb. 26, 1996

[86] PCT No.: PCT/IB96/00144

§ 371 Date: Nov. 6, 1996

§ 102(e) Date: Nov. 6, 1996

[87] PCT Pub. No.: WO96/27998

PCT Pub. Date: Sep. 12, 1996

[30] Foreign Application Priority Data

Mar. 6, 1995 [DE] Germany .......................... 195 07 656

[51] Int. Cl.[7] ................................................. H04L 12/66
[52] U.S. Cl. .......................................... 370/463; 379/413
[58] Field of Search ...................... 370/463, 465, 370/200, 399, 437, 438, 442, 498, 522, 524, 904; 375/216, 265; 379/209, 221, 269, 77, 93, 94, 137, 201, 210, 309, 399, 413

[56] References Cited

U.S. PATENT DOCUMENTS

| | | | |
|---|---|---|---|
| 4,920,556 | 4/1990 | Wong | 379/51 |
| 4,998,274 | 3/1991 | Ephraim | 379/158 |
| 5,379,441 | 1/1995 | Watanabe et al. | 395/800 |
| 5,461,620 | 10/1995 | Bergler et al. | 275/216 |

*Primary Examiner*—Chau Nguyen
*Assistant Examiner*—Chiho Andrew Lee
*Attorney, Agent, or Firm*—Jack D. Slobod

[57] ABSTRACT

In a telecommunication system, more particularly for the range of ISDN technology, which includes a switching device (1), a telecommunication terminal unit (19) coupled to the switching device (1) via a first number of bus lines (3, 4, 5, 6), and (9, 10, 11, 12) for providing phantom power supply to the telecommunication terminal unit (19) via the first number of bus lines (3, 4, 5, 6), user communication means including actuation switches (28) and indicator lamps (29) are coupled to the telecommunication terminal unit (19) via a second number of bus lines (14, 115, 16, 17). This enables simplified telecommunication with minimum circuitry and cost. Power is supplied to the communication means (28, 29) by the telecommunication terminal via the second number of bus lines (14, 15, 16, 17).

8 Claims, 1 Drawing Sheet

TELECOMMUNICATION SYSTEM

BACKGROUND OF THE INVENTION

1. Field of the Invention

The invention relates to a telecommunication system comprising a service switching point, a telecommunication terminal unit coupled to the service switching point by a first number of bus lines, and means for phantom power supply of the telecommunication terminal unit by the first number of bus lines.

2. Description of the Related Art

In such a telecommunication system, which particularly represents an ISDN-PBX (Private Branch eXchange), there is often the need to provide, in addition to the telecommunication terminal units which are generally enhanced-feature terminal units having many performance features, for example, added-feature telephones, a possibility of exchanging information signals within the telecommunication system, which possibility is simpler compared to the use of such telecommunication terminal units. This is the case, for example, where an emergency call system for emergencies for people in need of care is necessary. In emergencies, the operation of a complex telecommunication terminal unit such as, for example, an added-feature telephone, is too unreliable. Prior-art emergency call systems do not allow communication with a telecommunication system comprising a service switching point, so that an independent installation of the systems is necessary. The technical capacity of such a telecommunication system then remains unused. In addition, the separate cabling for the telecommunication system and the emergency call system is costly.

OBJECT AND SUMMARY OF THE INVENTION

Therefore, it is an object of the invention to improve the telecommunication system of the type defined in the opening paragraph, so that the possibility of simplified telecommunication is created with minimum expenditure.

The object is achieved in that communication means for communication to a user are provided which are coupled to the telecommunication terminal unit by a second number of bus lines and in that the communication means are supplied with power by the telecommunication terminal unit via the second number of bus lines.

Since both the power supply of the telecommunication terminal unit and the power supply of the information generating means are based on the same phantom power supply, there is guaranteed that also when bus lines are mixed up during the installation of the system, no disturbances in the service switching point can be caused by a short-circuit. A telecommunication system integrating ISDN technology, thus a telecommunication system with digital switching technology, can be extended with little expenditure in the manner according to the invention. For example, additional hardware in the telecommunication terminal unit is needed only to a limited extent. The telecommunication terminal unit may then be arranged, for example, as an ISDN telephone.

The communication means transform either DC signals coming from the telecommunication terminal unit into acoustic or optical signals for the user, or entries of the user in the communication means into DC signals for the telecommunication terminal unit. In many cases, the second number of bus lines are already provided when the telecommunication system as defined in the opening paragraph is installed. In such a case, no circuitry for additional bus lines is necessary. For a re-installation of the telecommunication system, the fact that the second number of bus lines is rendered available represents little additional cost of circuitry. It is not necessary for the telecommunication terminal unit and the communication means to have separate power supplies.

In an embodiment of the invention there is provided that a DC voltage used for supplying power to the communication means is also provided for transmitting information between the communication means and the telecommunication terminal unit. The circuitry for the insertion of the communication means into the telecommunication system is restricted to a maximum level. More particularly, at least one actuation switch can be used as a communication means, which switch is preferably used as an emergency call switch. Ease of handling is then ensured.

In another embodiment, there is provided that the DC voltage resulting from the phantom power supply is used for generating a DC current via the actuation switch in dependence on its switching state and in that this DC current is used for detecting the switching state of the actuation switch by the telecommunication terminal unit. The actuation by the actuation switch more particularly establishes a transmission of an emergency call signal from the telecommunication terminal unit to an emergency call service and/or to another subscriber terminal unit. Advantageously, the transmission of the emergency call signals is effected via a speed dialing of the telecommunication terminal unit. An actuation switch represents a highly simple possibility of transmitting an emergency call to other stations of the telecommunication system. For example, the closing of the actuation switch causes a DC current to flow, which may easily be detected by the telecommunication terminal unit. The presence of such a DC current may then be simply transformed into a speed dialing by the telecommunication terminal unit, so that an emergency call service and/or another telecommunication terminal unit is called via the service switching point from which terminal unit the actuation of the actuation switch and thus the emergency call may be responded to.

Display means may be used as communication means in addition or as an alternative to the actuation switch.

Possible display means are, for example, incandescent lamps and light-emitting diodes. A user is informed, for example, by the display means whether the telecommunication system is in an error-free condition. The information flow is directed here from the telecommunication terminal unit to the display means. An error-free condition of the telecommunication system may be displayed by the display means and this is especially intended to reassure the users of the system who generally heavily depend on the functioning of the emergency call system.

The invention likewise relates to a telecommunication terminal unit, more particularly an ISDN telecommunication terminal unit, to be used in the telecommunication system as described above, characterized in that an output is provided which is used for supplying the DC voltage to the communication means, in that the DC voltage is generated by the phantom power supply used for supplying power to the telecommunication terminal unit, in that detecting means for detecting a DC current which can be generated by the DC voltage are assigned to the output, and in that speed dialling is released in dependence on the detection of said DC current.

These and other aspects of the invention will be apparent from and elucidated with reference to the embodiments described hereinafter.

DETAILED DESCRIPTION OF THE PREFERRED EMBODIMENTS

Figure 1:
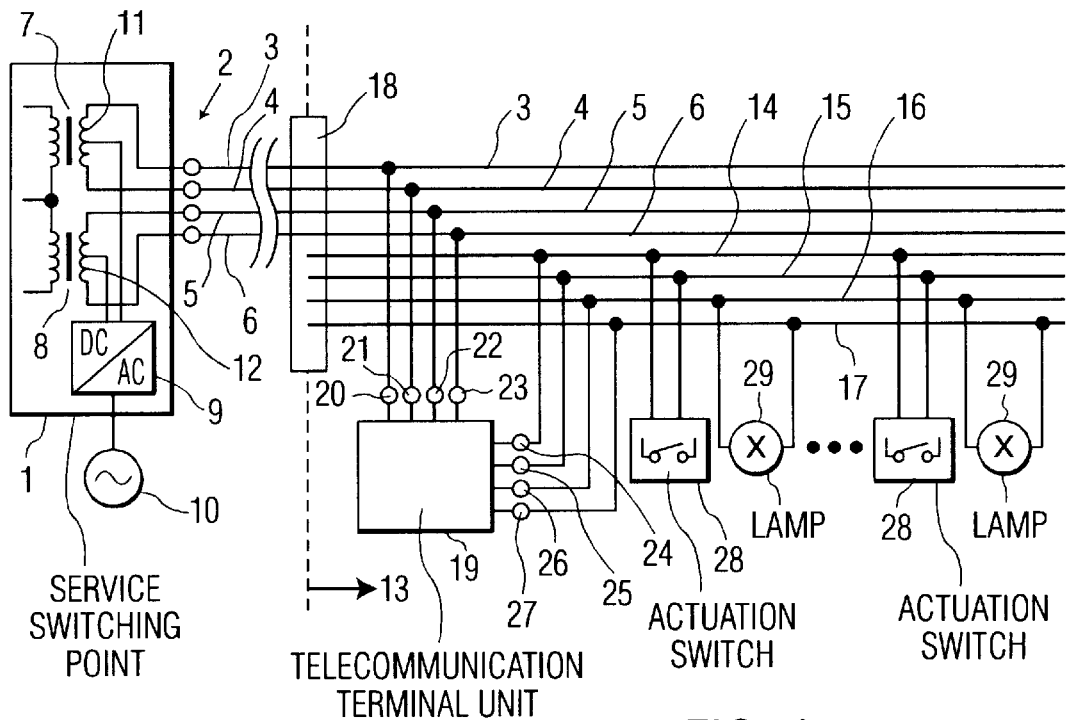
FIG. 1 shows a telecommunication system according to the invention.

The telecommunication system represented in FIG. 1 comprises a service switching point 1, in the present case an ISDN-PBX, whose output is connected to an $S_o$ bus 2, which comprises four bus lines 3, 4, 5 and 6. The $S_o$ bus is coupled to the circuit arrangements of the service switching point 1 via transformers 7 and 8 arranged on the output side of the service switching point 1, which transformers are not shown here and have the customary structure for such a service switching point 1. For the phantom power supply (remote power supply) to subscriber terminal units connected to the $S_o$ bus 2, a converter 9 is provided which transforms an AC voltage 10 (220 Volts, mains voltage) into a DC voltage and supplies this DC voltage to the $S_o$ bus 2 via central taps 11 and 12 of the coils of the transformers 7 and 8.

In a spatially limited range 13 (for example, a room, a house) four further bus lines 14, 15, 16 and 17 are installed in parallel with the $S_o$ bus 2 having the bus lines 3, 4, 5 and 6, which former bus lines lose their energy to an interface 18 at the transition to the range 13. Installing a bus of 8 bus lines compared with installing a bus of four bus lines does not require much circuitry. In many cases the installation of a bus of 8 bus lines is already provided when the telecommunication system is installed also from the point of view that $S_o$ plug-in connections are defined to have 8 poles according to ISO/IEC-8877 standard.

A telecommunication terminal unit 19, in the present case an ISDN telephone, is connected to the bus lines 3, 4, 5 and 6 via terminals 20, 21, 22 and 23. The telecommunication terminal unit 19 is coupled to the bus lines 14, 15, 16 and 17 via terminals 24, 25, 26 and 27. The terminals 20 to 27 are advantageously combined to an 8-pole $S_o$ plug-in connection according to the ISO/IEC-8877 standard (Western plug). At least an actuating switch 28 is coupled to the bus lines 14 and 15. At least one incandescent lamp 29 used as a display means is coupled to the bus lines 16 and 17. In lieu of the incandescent lamps, it is also possible to utilize light-emitting diodes. Also the use of acoustic display means is possible. When switch 29 is actuated, a signal can be transmitted to the telecommunication terminal unit 19 by the bus lines 14 and 15. Furthermore, information coming from the subscriber terminal unit 19 can be displayed on the display means 29.

The described telecommunication system is particularly used as a telecommunication device integrating an emergency call system, for example, in hospitals or in nursing homes for the elderly. In case of emergencies, a user in distress can send a distress signal to the telecommunication terminal unit 19 by actuating the switch 28. The display means 29 are particularly used for acknowledging the correct reception of the distress signal to the subscriber terminal unit 19. It is also conceivable to display an error-free condition of the emergency system. The display means 29, are then used for calming down a person in distress.

Figure 2:
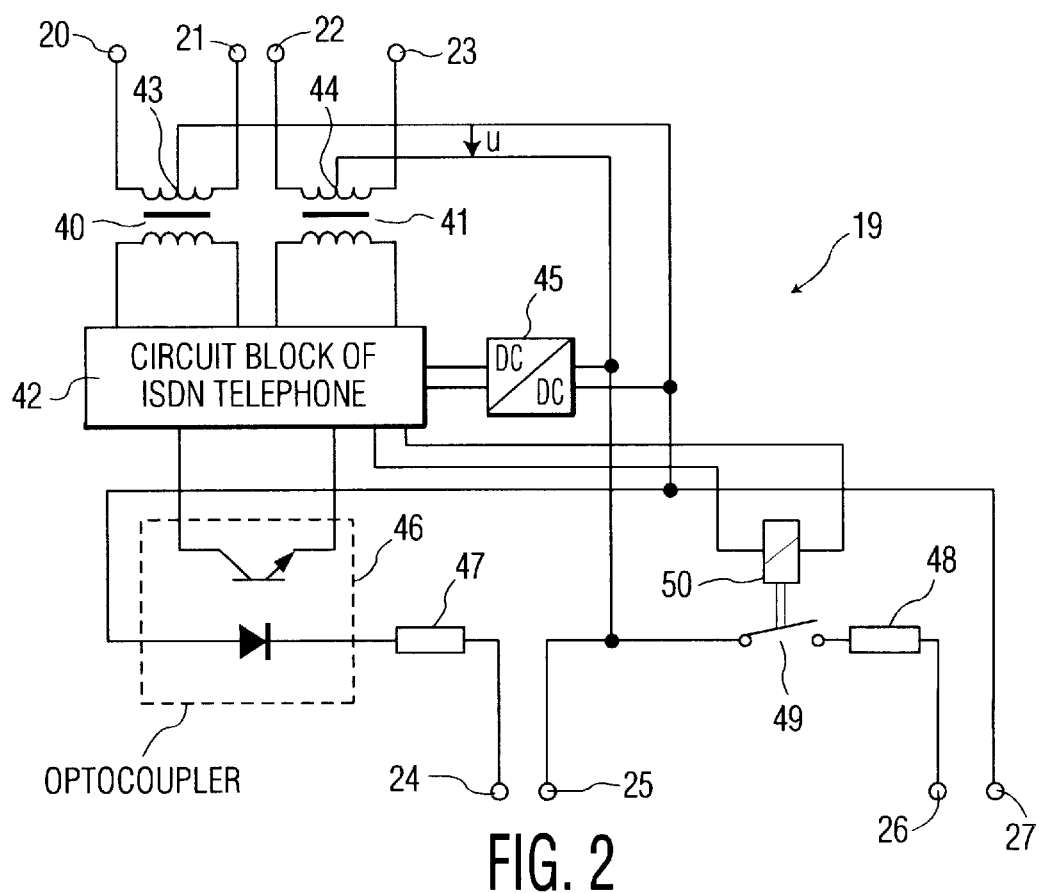
FIG. 2 shows a telecommunication terminal unit for the telecommunication system.

With reference to FIG. 2, the structure and the mode of operation of the telecommunication terminal unit 19 will be explained in more detail. This unit comprises, on the input side, two transformers 40 and 41 by which the circuit block 42 is coupled to the terminals 20, 21, 22 and 23 and thus to the $S_o$ bus 2. The circuit block 42 is used, for example, for processing the switching information transmitted by the $S_o$ bus 2 or for processing speech or data signals. With respect to this, the circuit block 42 comprises the circuit arrangements customary for an ISDN telephone.

The transformers 40 and 41 have central taps 43 and 44 by which the DC supply voltage U resulting from the phantom power supply by the service switching point 1 can be tapped. The DC supply voltage U is transduced by a transducer 45 into a DC voltage whose value has changed, which changed value is used for supplying power to the circuit arrangements of the circuit block 42.

The potential present on the central tap 43 is applied to the series combination of an optocoupler 46 and a resistor 47 used as a power limiter, at the other end of which series combination is the terminal 24 of the subscriber terminal unit 19, which is coupled to the bus line 14 of the telecommunication system. At terminal 25, which is coupled to the bus line 15 of the telecommunication system, is available the potential generated on the central tap 44.

If one of the actuation switches 28 is closed, this leads to a power flowing through the actuation switch 28, the optocoupler 46 and the resistor 47, after which the optocoupler 46 generates a respective control signal in circuit block 42. The circuit block 42 comprises circuit arrangements which immediately interrupt a call held by the telecommunication terminal unit 19 in such a case and carry out a speed dialing, so that a call signal or emergency call signal for an emergency call service (not shown), for example another subscriber terminal unit and switched to the service switching point 1. For this speed dialing, an appropriate speed dialing number is stored in a dialing number memory of the telecommunication terminal unit. Furthermore, a programming can be blocked for the telecommunication terminal unit 19 to avoid a reprogramming by a person in distress and thus a breakdown of the emergency call system.

The potential on the central tap 43 is also available on a terminal 27 of the subscriber terminal unit 19. Furthermore, a terminal 26 is coupled via the series combination formed by a resistor 48 acting as a power limiter and a relay-controlled switch 49 to the potential present on the central tap 44. The relay 50 for controlling the switch 49 is controlled by circuit arrangements of the circuit block 42. In normal operation (no emergency call), the circuit block 42 triggers the relay 50 so that the switch 49 is opened and, as a result of the DC supply voltage U, no DC current for the display means 29 flowing through the terminals 26 and 27 and the bus lines 16 and 17 is generated. In that case the incandescent lamps 29 do not light up. When an emergency call signal is issued by actuating the actuation switch 28, the circuit block 42 controls the relay 50 so that the switch 49 is closed. The display means 29 are now supplied with the DC current via the terminals 26 and 27. The incandescent lamps 29 light up and the user of the emergency call system is informed of the correct reception of the emergency call signal. It would also be appropriate to have an arrangement in which the incandescent lamps light up as long as the telecommunication system including the emergency call system works perfectly well, and in which the incandescent lamps go out when there is a disturbance.

Advantageously, no separate power supply is necessary for the actuation switch 28 and the display means 29 which are used as communication means for simplified communication to a user, because the respective supply voltage available on the terminals 24 and 25; 26 and 27 respectively, is derived from the DC supply voltage U resulting from the phantom power supply. The DC supply voltage U is available in each ISDN telephone. No additional circuitry is necessary for generating this DC supply voltage. The circuitry for implementing an emergency call system described above in the telecommunication system arranged according to the invention is very low. Since both the telecommunication terminal unit 19 and the actuation switch 28 and the display means 29 do not have their own power supply, there is ensured that even if bus lines are mixed up during the installation of the telecommunication system, a disturbance of switching units of the service switching point 1 as a result of a short-circuit is impossible.

What is claimed is:

1. A telecommunication system comprising a service switching point, a telecommunication terminal unit coupled to the service switching point by a first number of bus lines, means for supplying phantom power from the service switching point to the telecommunication terminal unit via the first number of bus lines, communication means including means for actuation by a user remote from the telecommunications unit and means remote from the telecommunications unit for providing an indication intelligible to the user to acknowledge that said actuation has been detected by the telecommunications unit, said communication means being coupled to the telecommunication terminal unit by a second number of bus lines and being supplied with power by the telecommunication terminal unit via the second number of bus lines, the power supplied by the telecommunications terminal unit to the communications means being derived from the phantom power supplied to the telecommunications terminal unit.

2. The telecommunication system as claimed in claim 1, wherein the power supplied by the telecommunications terminal unit to the communication means is a DC voltage which is also provided for transmitting information between the communication means and the telecommunication terminal unit.

3. The telecommunication system as claimed in claim 1, wherein said means for actuation by a user comprises at least an actuation switch.

4. The telecommunication system as claimed in claim 3, wherein the actuation switch is an emergency call switch.

5. The telecommunication system as claimed in claim 3, wherein a DC voltage resulting from the means for supplying phantom power is used for generating a DC current via the actuation switch in dependence on its switching state and this DC current is used for detecting the switching state of the actuation switch by the telecommunication terminal unit.

6. The telecommunication system as claimed in claim 3, wherein an emergency call signal is transmitted from the telecommunication terminal unit to an emergency call service and/or another terminal unit in response to an actuation of the actuation switch.

7. The telecommunication system as claimed in claim 6, wherein the emergency call signal is transmitted by speed dialing the telecommunication terminal unit.

8. The telecommunication system as claimed in claim 1, wherein said communication means comprises at least a display means for providing said user intelligible indication.

* * * * *